United States Patent [19]

Renfrew et al.

[11] 3,989,451

[45] Nov. 2, 1976

[54] THERMOFIX PROCESS FOR THE DYEING OF POLYESTER FIBERS

[75] Inventors: Edgar Earl Renfrew; Dominic Andrew Zanella, both of Lock Haven, Pa.

[73] Assignee: American Color & Chemical Corporation, Charlotte, N.C.

[22] Filed: Feb. 15, 1974

[21] Appl. No.: 442,827

Related U.S. Application Data

[62] Division of Ser. No. 241,810, April 6, 1972, Pat. No. 3,884,901.

[52] U.S. Cl. .................. 8/41 C; 260/205; 260/207; 260/207.1
[51] Int. Cl.² ............................. D06P 1/39
[58] Field of Search .............. 260/207, 207.1, 207.5, 260/205; 8/41 C, 41 R

[56] References Cited
UNITED STATES PATENTS
3,787,178   1/1974   Renfrew .................. 8/41 C

*Primary Examiner*—Christopher A. Henderson
*Attorney, Agent, or Firm*—Armstrong, Nikaido & Wegner

[57] ABSTRACT

Polyester is dyed through thermofixation in fast shades with azo dyestuffs of the formula

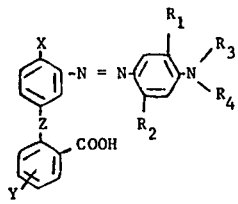

wherein
$R_1$ is hydrogen, chlorine, bromine, lower alkyl, or lower alkoxy;
$R_2$ is hydrogen, chlorine, bromine, lower alkyl, lower alkoxy, $R_7CONH$— or $R_7SO_2NH$—;
$R_3$ is hydrogen, lower alkyl, hydroxy(lower alkyl), lower alkoxy(lower alkyl), cyano(lower alkyl), chloro(lower alkyl), bromo(lower alkyl) or

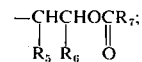

$R_4$ is hydrogen, lower alkyl, hydroxy(lower alkyl), lower alkoxy(lower alkyl), cyano(lower alkyl), chloro(lower alkyl), bromo(lower alkyl), benzyl, chlorobenzyl, bromobenzyl, nitrobenzyl or

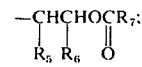

one of $R_5$ and $R_6$ is hydrogen or methyl;
and the other $R_5$ and $R_6$ is hydrogen;
each $R_7$ is independently lower alkyl, chloro(lower alkyl) bromo(lower alkyl), cyano(lower alkyl), phenyl, chlorophenyl, bromophenyl, lower alkylphenyl, lower alkoxyphenyl or cyanophenyl;
X is hydrogen, chlorine, bromine, lower alkyl, lower alkoxy, hydroxy(lower alkyl) or lower alkoxy(lower alkoxy);
Y is hydrogen, chlorine, or bromine; and
Z is methylene or carbonyl.

5 Claims, No Drawings

THERMOFIX PROCESS FOR THE DYEING OF POLYESTER FIBERS

This is a division of application Ser. No. 241,810, filed Apr. 6, 1972, now U.S. Pat. No. 3,884,901.

BACKGROUND OF THE INVENTION

Azo dyes bearing water solubilizing groups have long been known as dyestuffs for natural polyamide fibers. Typically such azo dyes have contained at least one sulfonic acid group, although a relatively minor amount of the research in azo dyes for natural polyamide fibers has been devoted to sulfonic acid-free azo dyes which contain at least one carboxylic acid group. It is generally recognized in the art that such azo dyes are generally unsuited for the dyeing of synthetic fibers such as polyethylene terephthalate.

We have now discovered a novel dyeing process which makes use of the thermofixation process and a specific class of azo dyes which yields excellent dyeings on polyesters, particularly polyethylene terephthalate, with azo dyes containing a free carboxylic acid group.

SUMMARY OF THE INVENTION

In accordance with the invention there are provided polyester dyeings with compounds of the formula:

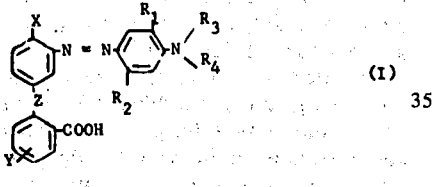

wherein
$R_1$ is hydrogen, chlorine, bromine, lower alkyl, or lower alkoxy;

$R_2$ is hydrogen, chlorine, bromine, lower alkyl, lower alkoxy, $R_7$-CONH— or $R_7SO_2NH$—;

$R_3$ is hydrogen, lower alkyl, hydroxy(lower alkyl), lower alkoxy(lower alkyl), cyano(lower alkyl), chloro (lower alkyl), bromo(lower alkyl) or

$R_4$ is hydrogen, lower alkyl, hydroxy(lower alkyl), lower alkoxy(lower alkyl), cyano(lower alkyl), chloro(lower alkyl), bromo(lower alkyl), benzyl, chlorobenzyl, bromobenzyl, nitrobenzyl or

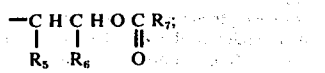

one of $R_5$ and $R_6$ is hydrogen or methyl; and the other $R_5$ and $R_6$ is hydrogen;

each $R_7$ is independently lower alkyl, chloro(lower alkyl), bromo(lower alkyl), cyano(lower alkyl), phenyl, chlorophenyl, bromophenyl, lower alkylphenyl, lower alkoxyphenyl or cyanophenyl;

X is hydrogen, chlorine, bromine, lower alkyl, lower alkoxy, hydroxy(lower alkyl) or lower alkoxy(lower alkoxy);

Y is hydrogen, chlorine, or bromine; and

Z is methylene or carbonyl.

DETAILED DESCRIPTION

As the starting material for the preparation of the azo dyestuffs(I) may be mentioned a base of the formula

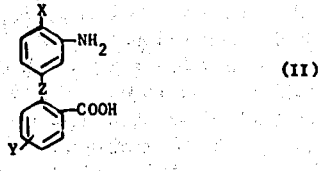

wherein X, Y and Z are as defined above. The base (II) is converted to a diazotized base of the formula

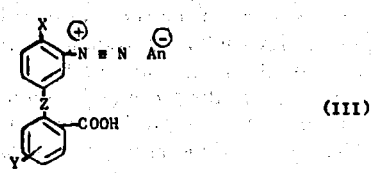

wherein X, Y and Z are as defined above and An⁻ is anion. To produce the azo dyestuffs(I), the diazotized base (III) is treated with a coupler of the formula

wherein $R_1$, $R_2$, $R_3$ and $R_4$ are as defined above.

A convenient diazotization method involves treating the base (II) in cold water containing enough hydrochloric acid to make the medium strongly acidic and adding thereto an amount of sodium nitrite at least stoichiometrically equivalent to the amount of base, the reaction mass being maintained at or near the temperature of melting ice. A surface active material with emulsifying properties may advantageously be used. The diazotized base is essentially soluble in the acid medium provided the volume is adequate.

Another diazotization method involves dissolving sodium nitrite in concentrated sulfuric acid, heating to a temperature of about 60°–70° C, cooling the resulting solution to 0°–10° C and adding thereto the base (II).

The azo dyestuffs (I) are made by the reaction of the diazotized base (III) with the coupler (IV) by adding the diazonium salt to a cold aqueous acidic solution of the coupler. A buffering agent, such as sodium acetate may be added to reduce the acidity to a pH of 5 to 7. The mixture is allowed to react for up to several hours at room temperature and is thereafter filtered and washed acid free. The desired azo dyestuff (I) is thus obtained in the form of a wet cake.

It may be noted that in the particular cases where $R_3$ and $R_4$ are together desired to be hydrogen, it is often advantageous to convert the coupler (IV) to the arylaminomethanesulfonic acid salt (V) through the use of formaldehyde and sodium bisulfite in known manner.

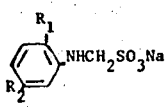
(V)

Coupling may then be carried out in the usual way. After formation of the monoazo body, hydrolysis of the alkylenesulfo moiety can be brought about by gentle heating in dilute aqueous alkali, forming the azo dyestuff (I) in which $R_3 = R_4 = H$. (The dyestuff is somewhat soluble in dilute aqueous alkali due to the carboxylic group. Neutralization of the hydrolysis medium facilitates isolation of the azo dyestuff (I) ). The method is especially useful in those cases in which $R_1$ is hydrogen, alkyl, chlorine or bromine, and often helpful in achieving better yields when $R_1$ is alkoxyl.

The products produced from the coupling reaction, when suitably dispersed, are excellent dyes for polyester fabrics, and are particularly suited for dyeing polyester by thermofixation methods.

To prepare the product for application to the polyester substrates the product must be suitably dispersed. This may be done in any of several well-known methods, milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye is preferably applied to the aromatic polyester fiber by thermofixation methods, such as the "Thermosol" process. This process involves padding the cloth with a dilute dye dispersion, followed by drying to remove water (e.g., by preheating with infrared heat) and curing by dry heat fixation using dried hot air or heated contact rolls. Curing or fixation temperatures of 350°–430° F are used for less than 2 minutes, usually for 30 to 90 seconds. Ordinarily, if the padded fabric is entirely polyester, curing is done at 400°–430° F. If the fabric contains cotton or viscose rayon, apart from synthetic fibers, there is little danger of damaging cellulosic portions, but if wool is present, the curing temperature must be kept below 357° F and the time must be reduced to about 30 seconds.

For durable press finishing of mixed polyester-cotton blends, after thermofixation the residual unfixed dye is removed from the fabric by scouring and the cleaned fabric is given a durable press cure at 300°–350° F. The new dyes of the invention show an excellent diffusion rate in the polyester fibers at the dyeing temperature and a low diffusion rate at the preferred press curing temperature of 300°–350° F.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The invention is further illustrated by the following examples:

EXAMPLE I

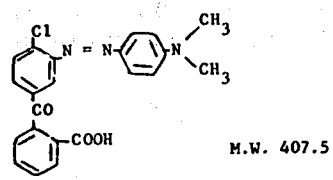

M.W. 407.5

A. Diazo

| | |
|---|---|
| | There is charged to a 3000 ml. beaker |
| 300.0 ml. | water |
| 60.0 g. | hydrochloric acid (32%) |
| 55.1 g. | 4'-chloro-3'-amino-o-benzoylbenzoic acid (0.2 mole) and |
| 5.0 g. | "Tween 20" (a commercially available surface active material). |
| | The mixture is heated to 80° C, allowed to stir and cool to 30° C and iced to 0° C. At 0–5° C there is added to the mixture, during a period of 15 minutes, a solution of |
| 15.0 g. | sodium nitrite dissolved in |
| 50.0 ml. | cold water. |
| | The diazotization mixture is stirred 2 hours at 0–5° C, then the excess nitrous acid is destroyed with sulfamic acid and the diazo clarified and kept at 0–5° C. |

B. Coupler

| | |
|---|---|
| | A 4000 ml. beaker is charged with |
| 400.0 ml. | water at 60° C |

| | -continued |
|---|---|
| 25.0 g. | N,N-dimethylaniline (0.206 mole) and |
| 30.0 g. | hydrochloric acid (32%). |
| | The mixture is stirred to complete solution and iced to 0° C. |
| C. Coupling | |
| | The diazo solution is added to the coupler solution at 0≅5° C. The mixture is stirred sixteen hours, during which time the temperature is allowed to rise to that of the room. The solids are then isolated by filtration and the filter cake is washed acid free and dried. Yield: 77.0 g.; 95.5% (0.2 mole = 81.5 g.) |
| D. Dispersion | |
| | A laboratory ball-mill is charged with |
| 60.0 g. | dry color (A, above) |
| 58.0 g. | "Lignosol FTA" (a commercially available ligninsulfonic acid dispersing agent) and |
| 282.0 ml. | cold water. |
| | The mixture is ball-milled for 12 hours. A paste of 15% color content was obtained. Dispersion: adequate, as shown by filter tests. |
| E. Evaluation: | |
| | When applied to polyethylene terephthalate by the recognized method (carrier, pressure, thermofixation) golden yellow hues of excellent light fastness and sublimation fastness are obtained. The dye is especially suitable for thermofixation dyeing. |

EXAMPLE II

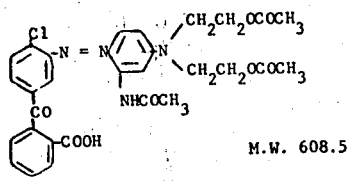

M.W. 608.5

EXAMPLE III

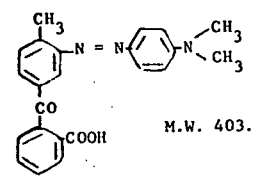

M.W. 403.

| A. Diazo | |
|---|---|
| | There is charged to a 3000 ml. beaker |
| 300.0 ml. | water |
| 60.0 g. | hydrochloric acid (32%) |
| 55.1 g. | 4'-chloro-3'-amino-o-benzoic acid (0.2 mole) and |
| 5.0 g. | "Tween 20". |
| | The mixture is heated to 80° C, allowed to stir and cool to 30° C and iced to 0° C. At 0–5° C there is added to the mixture, during a period of 15 minutes, a solution of |
| 15.0 g. | sodium nitrite dissolved in |
| 50.0 ml. | cold water. |
| | The diazotization mixture is stirred 2 hours at 0–5° C, then the excess nitrous acid is destroyed with sulfamic acid and the diazo clarified and kept at 0°5° C. |
| B. Coupler | |
| | A 4000 ml. beaker is charged with |
| 200.0 g. | ice, |
| 200.0 ml. | water, |
| 67.6 g. | 2,2'(3-acetamidophenylimino)diethanol diacetate (0.21 mole), |
| 40.0 g. | hydrochloric acid (32%) and |
| 50.0 g. | acetic acid. |
| | The mixture is stirred to solution and iced to 0° C. |
| C. Coupling | |
| | Coupling is carried out in the way described in Example I, Part C. Yield: 111.0 g. 91% (0.2 mole = 121.6 g.) |
| D. Dispersion | |
| | A laboratory ball-mill is charged with |
| 60.0 g. | monoazo material, (part C, above) |
| 58.0 g. | "Lignosol FTA" and |
| 282.0 ml. | cold water. |
| | The mixture is milled for 12 hours. A disperse paste containing 15% of dye base is obtained. The dispersion is satisfactory as shown by filter tests. |
| E. Evaluation: | |
| | Dyeings of clear red hues are obtained by treating polyethylene terephthalate fabric in known manners with the dispersion from D above. The dye dispersion is especially well suited for thermofix dyeing. Resistance to sublimation is outstandingly good. |

| A. Diazo | |
|---|---|
| | There is charged to a 3000 ml. beaker |
| 350.0 ml. | water |
| 60.0 g. | hydrochloric acid (32%) |
| 54.2 g. | 4'-methoxy-3'-amino-o-benzoylbenzoic acid (0.2 mole) and |
| 4.0 g. | "Tween 20". |
| | The mixture is heated to 70° C, allowed to stir and cool to 30° C and iced to 0° C. At 0–5° C there is added to the mixture, during a period of 15 minutes, a solution of |
| 15.0 g. | sodium nitrite dissolved in |
| 50.0 ml. | cold water. |
| | The diazotization mixture is stirred 3 hours at 0–5° C. Then the excess nitrous acid is destroyed with sulfamic acid and the diazo clarified and kept at 0–5° C. |
| B. Coupler | |
| | A 4000 ml. beaker is charged with |
| 400.0 ml. | water at 60° C |
| 25.0 g. | N,N-dimethylaniline (0.206 mole) and |
| 30.0 g. | 32% hydrochloric acid. |
| | The mixture is stirred to complete solution and iced to 0° C. |

C. Coupling

The coupling of the materials from Part A and Part B is carried out in the manner described in Example I, Part C. Yield: 71.-g. 88% (0.2 mole = 80.6 g.)

D. Dispersion

A 15% color content disperse paste is made in the manner described in Example I, Part D.

E. Evaluation

Dyeings on polyethylene terephthalate fabric produced by the disperse paste, Part D above, in established ways show clear scarlet dyeings of good properties, especially in resistance to sublimation.

EXAMPLE IV

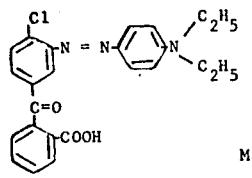

M.W. 435.5

A. Diazo

A diazonium solution is prepared exactly in the manner of Example I, Part A.

B. Coupler

A coupler solution is prepared exactly in the way described in Example I, Part B, except that 30.6 g. N,N-diethylaniline (M.W. 149; 0.205 mole) is used instead of N,N-dimethylaniline.

C. Coupling

The diazonium salt and the coupler are combined exactly in the way described in Example I, Part C, and the product isolated and treated similarly. The dry weight of the monoazo body produced is 84.5 g, or 97% of the theoretical yield of 87.0 g.

D. Dispersion

A 15% disperse paste is prepared in the way described in Example I, Part D.

E. Evaluation

Dyeings of the disperse paste (Part D, above) on polyethylene terephthalate fabric show a clear yellowish orange hue. Properties are very like those of the product of Example I, being excellent in fastness to light and to sublimation. The dye gives excellent color yield when dyed by the thermofixation method.

EXAMPLES V-LVII

By substituting an equimolar amount of the base (II) for the 3'-amino-4'-chloro-o-benzoylbenzoic acid and an equimolar amount of coupler (IV) for the N,N-dimethylaniline of Example I, otherwise following the procedure of Example I, azo dyestuffs (I) which dye polyethylene terephthalate via thermofixation in the shade indicated are obtained.

| EX. | X | Y | Z | $R_1$ | $R_2$ | $R_3$ | $R_4$ | Hue on Polyethylene Terephthalate |
|---|---|---|---|---|---|---|---|---|
| V | Cl | H | C=O | H | H | $CH_2CH_2OH$ | $CH_2CH_2OH$ | Orange |
| VI | Cl | H | C=O | H | H | $C_2H_5$ | $CH_2CH_2CN$ | Orange |
| VII | Cl | H | $CH_2$ | H | H | $CH_3$ | $CH_3$ | Reddish yellow |
| VIII | $OCH_3$ | H | $CH_2$ | H | H | $CH_2CH_2CN$ | $CH_2CH_2CN$ | scarlet |
| IX | Br | H | C=O | H | H | $CH_2CH_2CN$ | H | orange |
| X | Cl | H | C=O | H | $NHCOCH_3$ | $C_2H_5$ | $C_2H_5$ | scarlet |
| XI | Cl | H | C=O | $CH_3$ | H | $CH_2CH_2OH$ | $CH_2CH_2OH$ | orange |
| XII | H | H | C=O | $OCH_3$ | $CH_3$ | $CH_2CH_2OH$ | $CH_2CH_2OH$ | reddish orange |
| XIII | H | H | C=O | $OCH_3$ | $OCH_3$ | $CH_2CH_2OH$ | $CH_2CH_2OH$ | dull red |
| XIV | Cl | H | C=O | $OC_2H_5$ | $NHCOCH_3$ | $CH_2CH_2OCOCH_3$ | $CH_2CH_2OCOCH_3$ | bordeaux |
| XV | Cl | H | C=O | $OCH_3$ | $NHCOCH_3$ | $CH_2CH_2OCOC_2H_5$ | $CH_2CH_2OCH_2H_5$ | bordeaux |
| XVI | Cl | H | $CH_2$ | $OC_2H_5$ | $NHCOCH_3$ | $CH_2CH_2CN$ | $C_2H_5$ | rubine |
| XVII | Cl | H | C=O | $OC_2H_5$ | $NHCOCH_3$ | $CH_2CH_2OCOCH_2Cl$ | $CH_2CH_2OCOCH_2Cl$ | bordeaux |
| XVIII | $CH_3$ | H | C=O | H | H | $CH_3$ | $CH_3$ | orange |
| XIX | $C_2H_5$ | H | C=O | H | NHCO—⟨⟩ | $CH_2CH_2OCOCH_3$ | $CH_2CH_2OCOCH_3$ | dull red |
| XX | Cl | H | C=O | $OCH_3$ | $CH_3$ | $CH_2CH_2Br$ | $CH_2CH_2CN$ | red |

-continued

| EX. | X | Y | Z | $R_1$ | $R_2$ | $R_3$ | $R_4$ | Hue on Polyethylene Terephthalate |
|---|---|---|---|---|---|---|---|---|
| XXI | H | H | C=O | $OCH_3$ | $OCH_3$ | H | H | yellowish red |
| XXII | Cl | H | C=O | H | $NHSO_2$—⟨⟩ | $CH_2CH_2OH$ | $CH_2CH_2OH$ | red |
| XXIII | Cl | H | C=O | $OCH_3$ | H | H | H | yellowish orange |
| XXIV | Cl | H | C=O | H | Cl | $C_2H_5$ | $C_2H_5$ | orange |
| XXV | Cl | H | C=O | $OCH_3$ | $NHSO_2CH_3$ | $CH_2CH_2OCO$—⟨⟩—Br | $CH_2CH_2OCOC_2H_5$ | plum |
| XXVI | Cl | H | C=O | H | Br | $CH_3$ | $CH_3$ | reddish orange |
| XXVII | Br | H | C=O | $OC_2H_5$ | $OC_2H_5$ | $CH_2CH_2OH$ | $CH_2CH_2OH$ | bluish red |
| XXVIII | Cl | H | C=O | H | $NHSO_2$—⟨⟩—$CH_3$ | $CH_2CH_2OCO$—⟨⟩—$CH_3$ | $CH_2CH_2OCOCH_3$ | red |
| XXIX | H | H | C=O | H | H | $CH_2CH_2CN_2CH_3$ | $CH_2CH_2CN$ | reddish yellow |
| XXX | Cl | H | C=O | H | H | $CH_2CH_2OCH_3$ | $CH_2CH_2OCH_3$ | orange |
| XXXI | Cl | H | C=O | H | H | $CH_2CH_2Cl$ | $CH_2CH_2CN$ | orange |
| XXXII | Cl | H | C=O | H | NHCO—⟨⟩ | $CH_2CH_2OCOCH_3$ | $CH_2CH_2COCH_3$ | red |
| XXXIII | Cl | H | C=O | H | H | $CH_3CH_2OCOC_3H_7$ | $CH_3$ | orange |
| XXXIV | Cl | H | C=O | H | H | $CH_2CH_2OCOCH_2CN$ | $C_2H_5$ | orange |
| XXXV | Cl | H | C=O | H | H | $CH_2CH_2OCOCH_2Br$ | $CH_2CH_3$ | orange |
| XXXVI | H | Cl | C=O | H | $CH_3$ | $CH_2CH_2OH$ | $CH_2CH_2CN$ | yellowish scarlet |
| XXXVII | Cl | Cl | C=O | H | H | $CH_3$ | $CH_3$ | orange |
| XXXVIII | $OCH_3$ | H | C=O | Br | H | $CH_2CH_2CN$ | H | reddish scarlet |
| XXXIX | H | Br | $CH_2$ | $OCH_3$ | NHCO—⟨⟩—Cl | $CH_2CH_2OCOCH_3$ | $CH_2CH_2OCOCH_3$ | dull violet |
| XL | $CH_3$ | H | C=O | $OCH_3$ | NHCO—⟨⟩—Br | $CH_2CH_2OCOCH_3$ | $CH_2CH_2OCOCH_3$ | dull violet |
| XLI | H | Br | C=O | H | H | $C_2H_5$ | $C_2H_5$ | orange |
| XLII | $OCH_2CH_2OH$ | H | C=O | Cl | H | $CH_2CH_2CN$ | $CH_3$ | scarlet |
| XLIII | $CH_3$ | H | C=O | $OC_2H_5$ | NHCO—⟨⟩—$CH_3$ | $CH_2CH_2OCOC_3H_7$ | $CH_2CH_2OCOC_3H_7$ | bordeaux |
| XLIV | H | H | $CH_2$ | $OC_2H_5$ | $NHCOCH_2CN$ | $CH_2CH_2OCO$—⟨⟩ | $CH_2CH_2OCOCH_3$ | bordeaux |
| XLV | $OCH_2CH_2OCH_3$ | H | $CH_2$ | $OCH_3$ | $OCH_3$ | $CH_2CH_2OH$ | $CH_2CH_2OH$ | plum |
| XLVI | H | H | C=O | H | $NHCOCH_2Cl$ | $CH_2CH_2OH$ | $CH_2CH_2OH$ | red |
| XLVII | $(CH_3)_2CH$ | H | C=O | H | H | $CH_2CH_2OCO$—⟨⟩—CN | $CH_3$ | orange |
| XLVIII | $OCH_3$ | Br | $CH_2$ | H | $NHCOCH_2Br$ | $CH_2CH_2OCOCH_3$ | $CH_2CH_2OCOCH_3$ | bluish red |
| XLIX | $OCH_3$ | H | C=O | $CH_3$ | H | $CH_2CH_2OCOCH_3$ | $CH_2CH_2OCOCH_3$ | red |
| L | $OCH_3$ | H | C=O | H | NHCO—⟨⟩—CN | $CH_2CH_2OCOCH_3$ | $CH_2CH_2OCOCH_3$ | bluish red |
| LI | Cl | H | C=O | $OCH_3$ | NHCO—⟨⟩—$CH_3$ | $CH_2CH_2OCO$—⟨⟩—CL | $CH_2CH_2OCOCH_3$ | bordeaux |
| LII | Cl | H | C=O | $OCH_3$ | $CH_3$ | $CH_2CH_2OCO$—⟨⟩—$OCH_3$ | $C_2H_5$ | red |
| LIII | Cl | H | C=O | H | H | $C_2H_5$ | $CH_2$—⟨⟩ | orange |
| LIV | Cl | H | C=O | H | H | $CH_3$ | $CH_2$—⟨⟩ | orange |
| LV | Cl | H | C=O | H | H | $C_2H_5$ | $CH_2$—⟨⟩—Cl | orange |
| LVI | H | H | C=O | H | $CH_3$ | $C_4H_9$ | $CH_2$—⟨⟩ | scarlet |
| LVII | Cl | H | C=O | H | H | $CH_2CH_2CN$ | $CH_2$—⟨⟩—Br | orange |

What is claimed is:

1. Polyester dyed with a compound of the formula

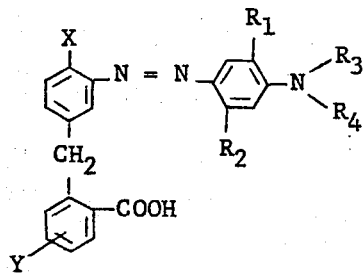

wherein
$R_1$ is hydrogen or lower alkoxy;
$R_2$ is hydrogen, lower alkoxy or $R_7CONH-$;
$R_3$ is lower alkyl, hydroxy(lower alkyl), cyano(lower alkyl) or $-CH_2CH_2OCOR_7$;
$R_4$ is lower alkyl, hydroxy(lower alkyl), cyano(lower alkyl), or $CH_2CH_2OCOR_7$;
$R_7$ is independently lower alkyl, bromo(lower alkyl), cyano(lower alkyl), phenyl, or chlorophenyl;
X is hydrogen, chlorine, lower alkoxy, or lower alkoxy (lower alkoxy); and
Y is hydrogen or bromine.

2. Polyester dyed with a compound of the formula

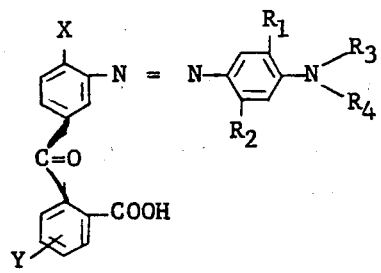

wherein $R_1$ is hydrogen, chlorine, bromine, lower alkyl, or lower alkoxy;
$R_2$ is hydrogen, chlorine, bromine, lower alkyl, lower alkoxy, $R_7CONH-$ or $R_7SO_2NH-$;
$R_3$ is hydrogen, lower alkyl, hydroxy(lower alkyl), lower alkoxy(lower alkyl), cyano(lower alkyl), chloro(lower alkyl), bromo(lower alkyl), or

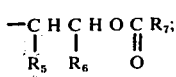

$R_4$ is hydrogen, lower alkyl, hydroxy(lower alkyl), lower alkoxy(lower alkyl), cyano(lower alkyl), chloro(lower alkyl) bromo(lower alkyl), benzyl, chlorobenzyl, bromobenzyl, nitrobenzyl or

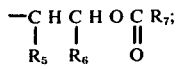

one of $R_5$ and $R_6$ is hydrogen or methyl; and the other of $R_5$ and $R_6$ is hydrogen;
each $R_7$ is indenpendently lower alkyl, chloro(lower alkyl), bromo (lower alkyl), cyano(lower alkyl), phenyl, chlorophenyl, bromophenyl, lower alkylphenyl, lower alkoxyphenyl or cyanophenyl;
X is hydrogen, chlorine, bromine, lower alkyl, lower alkoxy, hydroxy(lower alkyl) or lower alkoxy(lower alkoxy); and
Y is hydrogen, chlorine, or bormine.

3. Polyester dyed with a compound of claim 2 of the formula

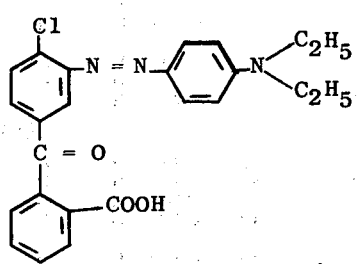

4. Polyester dyed with a compound of claim 2 of the formula

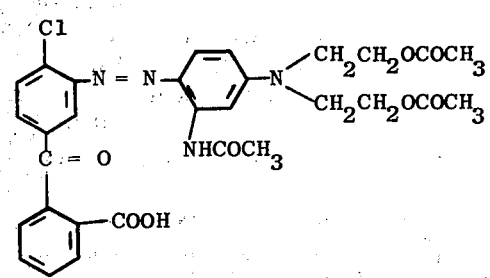

5. Polyester dyed with a compound of claim 2 of the formula

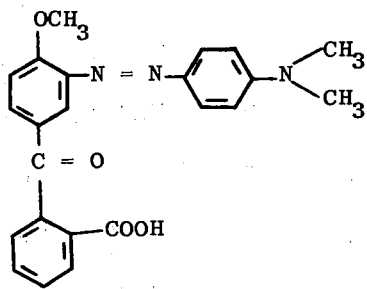

* * * * *